US006490619B1

United States Patent
Byrne et al.

(10) Patent No.: US 6,490,619 B1
(45) Date of Patent: Dec. 3, 2002

(54) METHOD AND SYSTEM FOR MANAGING MULTIPLE LIGHTWEIGHT DIRECTORY ACCESS PROTOCOL DIRECTORY SERVERS

(75) Inventors: Debora Jean Byrne, Austin, TX (US); Mickella Ann Rosiles, Austin, TX (US); Shaw-Ben Shepherd Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,702

(22) Filed: Dec. 7, 1999

(51) Int. Cl.[7] ............................................. G06F 15/173
(52) U.S. Cl. ............................ 709/223; 707/3; 345/737
(58) Field of Search ................................. 709/223, 203, 709/230, 217, 219, 225; 345/737, 738, 763, 781, 853; 707/3, 100, 513, 514, 520

(56) References Cited

U.S. PATENT DOCUMENTS 6,014,666 A * 1/2000 Helland et al. ............... 707/10
6,101,539 A * 8/2000 Kennelly et al. ............ 709/223
6,157,953 A * 12/2000 Chang et al. ................ 709/225
6,208,986 B1 * 3/2001 Schneck et al. ............... 707/1
6,339,827 B1 * 1/2002 Stokes et al. ................ 713/176
6,366,913 B1 * 4/2002 Fitler et al. .................. 707/10
6,366,954 B1 * 4/2002 Traversat et al. ......... 707/104.1

* cited by examiner

Primary Examiner—Mehmet B. Geckil
(74) Attorney, Agent, or Firm—Duke W. Yee; Leslie Van Leeuwen

(57) ABSTRACT

An improved method, apparatus, and instructions for locating a server in a distributed network using the Lightweight Directory Access Protocol (LDAP), maintaining information for the server, displaying a tree of servers, browsing the tree of servers, and searching the tree of servers for an entry with specific attributes is provided. The information maintained about the server includes its location, lists of attributes, and access control. The tree displayed can be for all servers combined or for an individual server. The search can be across the entire server or customized to a subset of servers. The search can be based on one of the following attributes: user, country, group, locality, access group, access role, organization, organization unit, domain, or can be based on user defined attributes.

34 Claims, 11 Drawing Sheets

METHOD AND SYSTEM FOR MANAGING MULTIPLE LIGHTWEIGHT DIRECTORY ACCESS PROTOCOL DIRECTORY SERVERS

FIELD OF THE INVENTION

The present invention relates generally to an improved distributed data processing system and in particular to an improved method and apparatus for accessing information in a distributed system. Still more particularly, the present invention relates to a method and apparatus for managing LDAP directory servers.

BACKGROUND OF THE INVENTION

A directory service is a central point where network services, security services and applications can form an integrated distributed computing environment. Typical uses of a directory services may be classified into several categories. A "naming service", such as Directory Naming Service (DNS) DNS or Cell Directory Service (CDS), uses the directory as a source to locate an Internet Host address or the location of a given server. A "user registry", such as Novel Directory Services (NDS), stores information about users is a system comprised of a number of interconnected machines. Still another directory service is a "white pages" lookup provided by some mail clients, such as Netscape Communicator or Lotus Notes.

With more and more applications and system services demanding a central information repository, the next generation directory server will need to provide system administrators with a data repository that can significantly ease administrative burdens. In the Internet/intranet environment, it will be required to provide user access to such information in a secure manner. It will be equally important to provide robust, and simple administrative tools to manage the directory content.

LDAP (Lightweight Directory Access Protocol) is a software protocol for providing directory service enablement to a large number of applications. These applications range from e-mail to distributed system management tools. LDAP is an evolving protocol model based on the client-server model in which a client makes a TCP/IP connection to an LDAP server. LDAP is a "lightweight" version of DAP (Directory Access Protocol), which is part of X.500, a standard for directory services in a network.

The LDAP information model in particular, is based on an "entry", which contains information about some object. Entries are typically organized in a specified tree structure, and each entry is composed of attributes. An example LDAP directory is organized in a simple "tree" hierarchy consisting of the following levels:

The "root" directory (the starting place or the source of the tree), which branches out to Countries, each of which branches out to Organizations, which branch out to Organizational units (divisions, departments, and so forth), which branches out to (includes an entry for)

Individuals (which includes people, files, and shared resources such as printers)

LDAP provides a number of known functions for manipulating the data in the information model. These include search, compare, add, delete, and edit. It provides a rich set of searching capability with which users can assemble complex queries to return desired information for later viewing and updating.

An LDAP directory can be distributed among many servers, with parts of data residing on a set of machines. Another scenario is where each server contains a replicated version of the total directory that is synchronized periodically. An LDAP server is called a Directory System Agent (DSA). An LDAP server that receives a request from a user takes responsibility for the request, passing it to other DSAs as necessary, either through server chaining or client referrals. Both cases ensure a single coordinated response for the user. Although directory structures can reside on a single server, there are several reasons for splitting directories across multiple machines. First, the directory may be too large to make it practical to store on a single server. Second, network administrators may want to keep the physical location of the server close to the expected clients to minimize network traffic.

A referral is used to show where a parent tree may be located. LDAP provides a mechanism for searching directories and for "chasing" referrals; however, the mechanism has several limitations. First, it is not possible to search the entire domain since a base domain name must be provided. The best that can be done is to search the main domain one suffix at a time.

Second, a referral chase does not show where the final results were found. A query that dereferences referrals may attempt many servers before finding the right one. This could drastically affect performance on subsequent related queries. Although these subsequent queries eventually may succeed, they go through the same server search as the original query rather that proceed directly to the correct server.

Third, where chasing referrals, the client must bind to each referred to server. This means the bind request will either be treated as an anonymous request or the client will be prompted for additional account information. This could be especially important if access control is set in a manner where a different authorization ID must be used in order for the operation to succeed.

Fourth, the search process cannot be customized by the user. For example, the user may want the search to be restricted to only two servers in an enterprise, but the LDAP search software forces all servers to be searched.

To overcome these limitations it would be advantageous to have an improved method and apparatus for searching and manipulating data within a set of servers in a distributed network.

SUMMARY OF THE INVENTION

The present invention provides an improved method, apparatus, and instructions for locating a server in a distributed network using the Lightweight Directory Access Protocol (LDAP), maintaining information for the server, displaying a tree of servers, browsing the tree of servers, and searching the tree of servers for an entry with specific attributes. The information maintained about the server includes its location, lists of attributes, and access control. The tree displayed can be for all servers combined or for an individual server. The search can be across the entire server or customized to a subset of servers. The search can be based on one of the following attributes: user, country, group, locality, access group, access role, organization, organization unit, domain, or can be based on user defined attributes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is designed to overcome the limitations of chasing LDAP referrals and to provide a user-friendly environment that allows server information to be displayed and manipulated in an intuitive manner. To understand the functionality of the invention it is best to examine a sequence of screen images showing how the user interacts with the system. The screen images shown are for a search operation but those of ordinary skill in the art will appreciate that any other LDAP operation could be performed.

Figure 1:
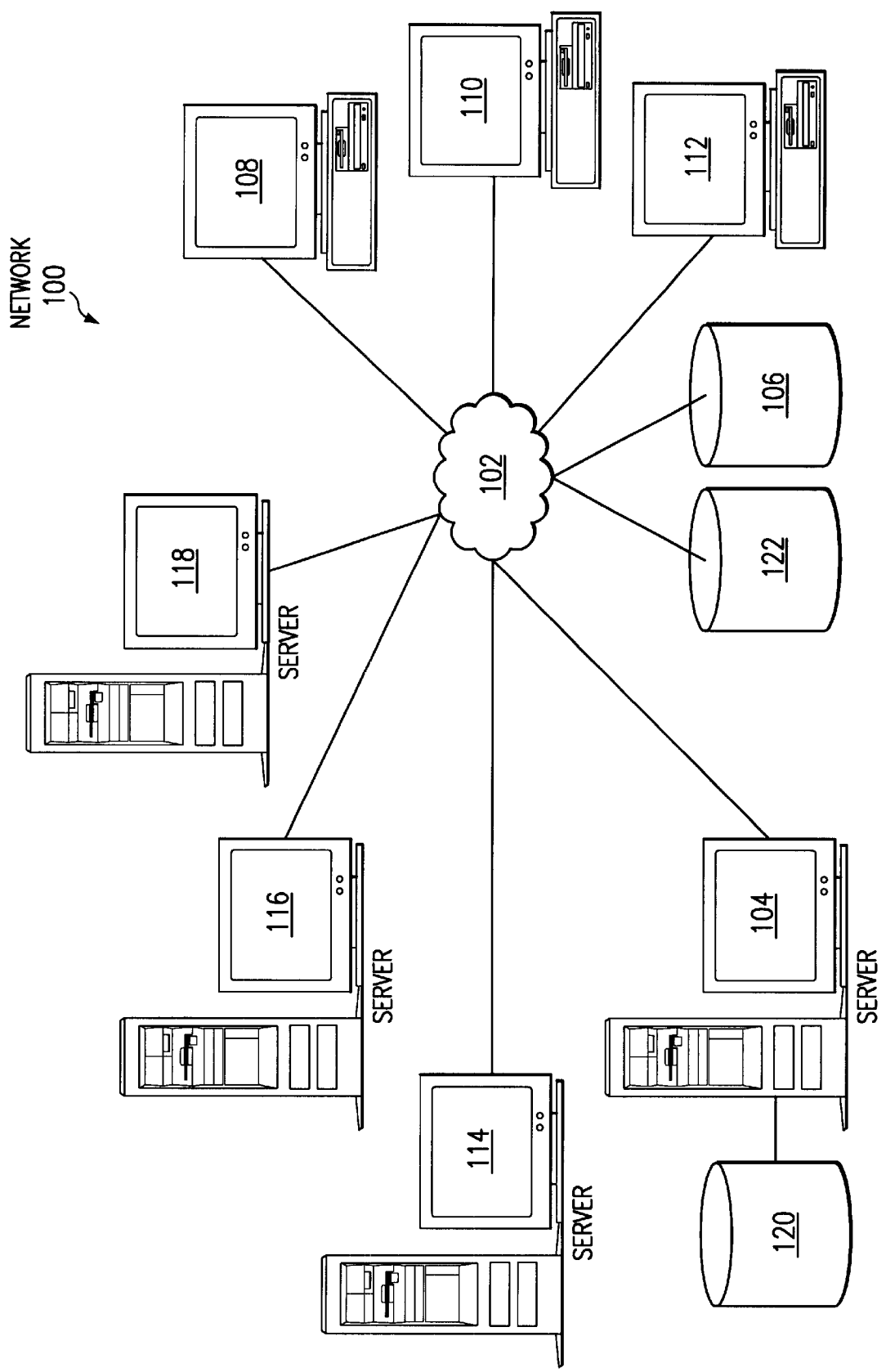
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
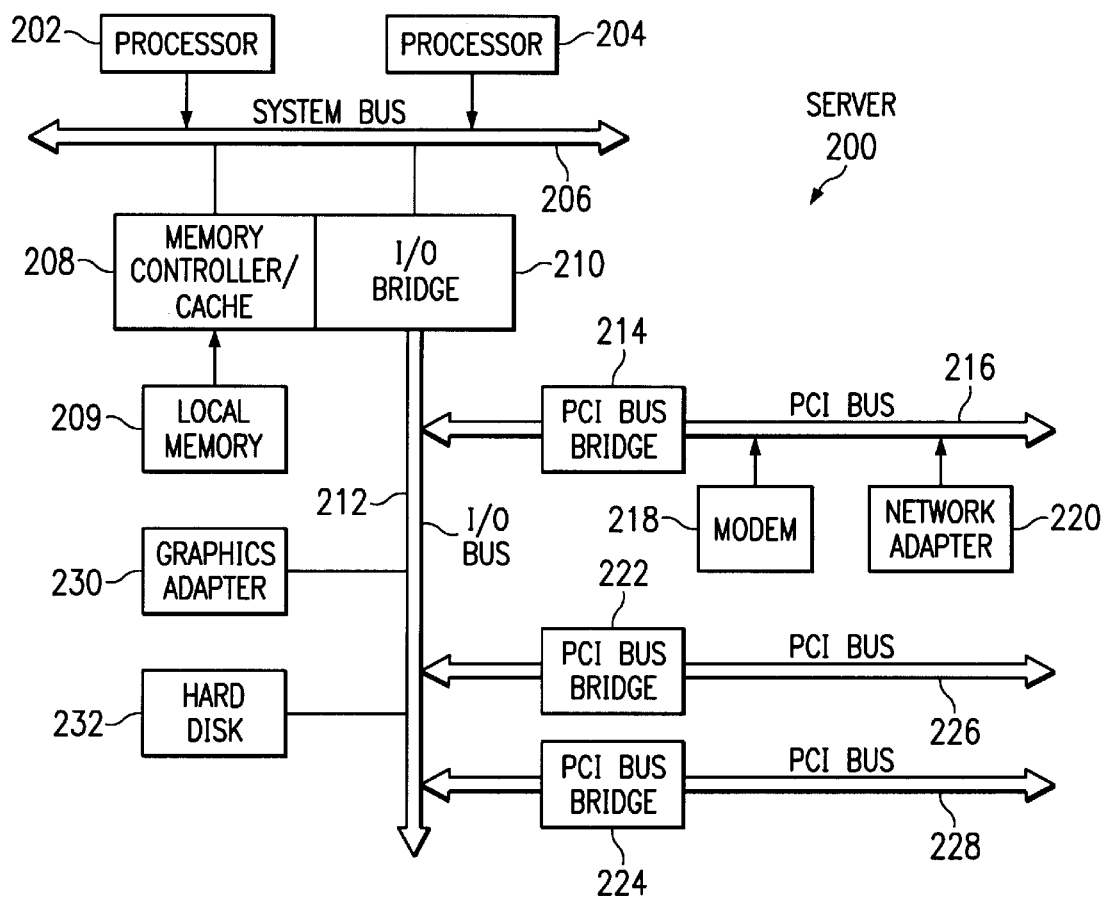
FIG. 2 is a block diagram of a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
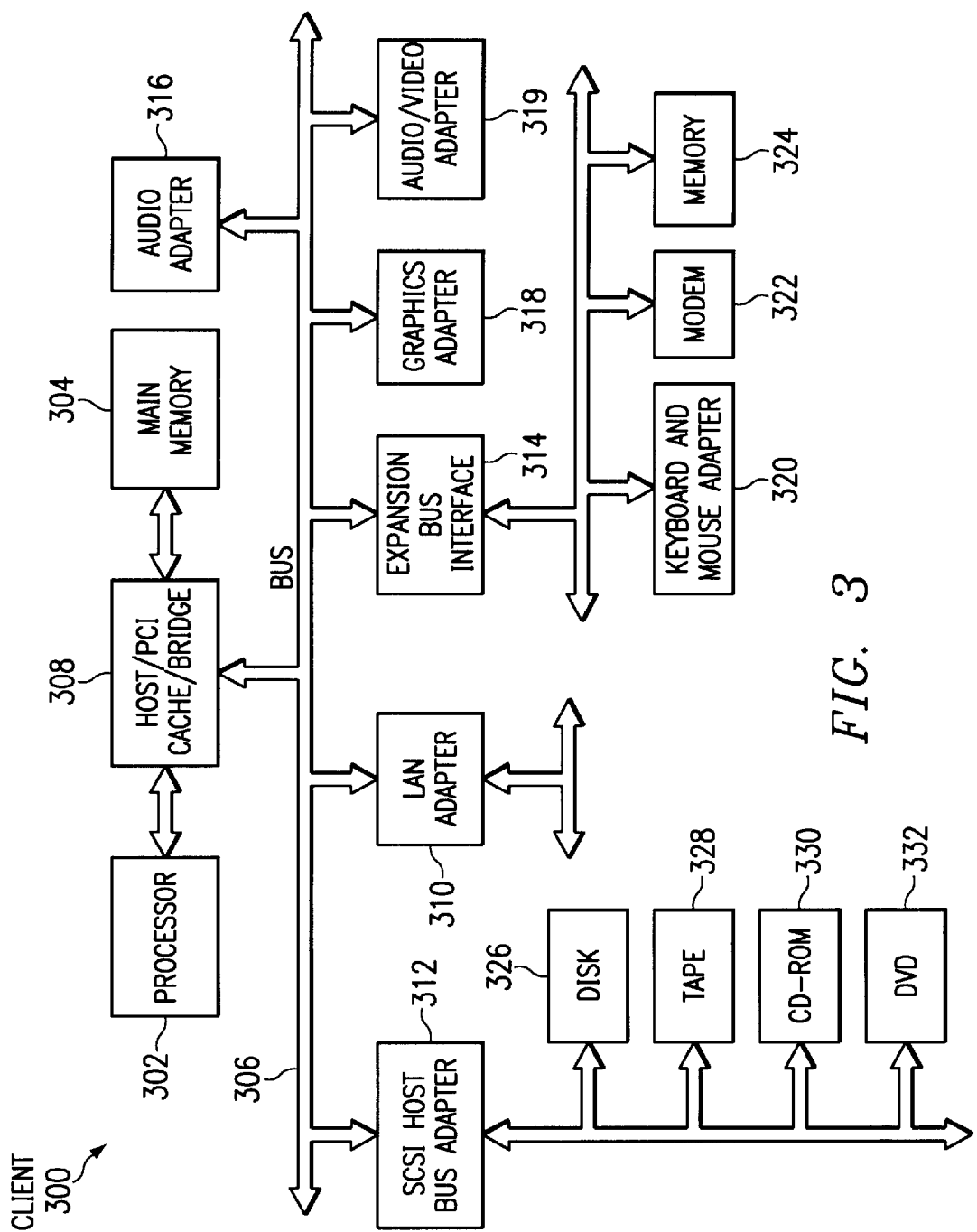
FIG. 3 is a block diagram of a data processing system in which the present invention may be implemented in accordance with a preferred embodiment of the present invention.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small Computer System Interface host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
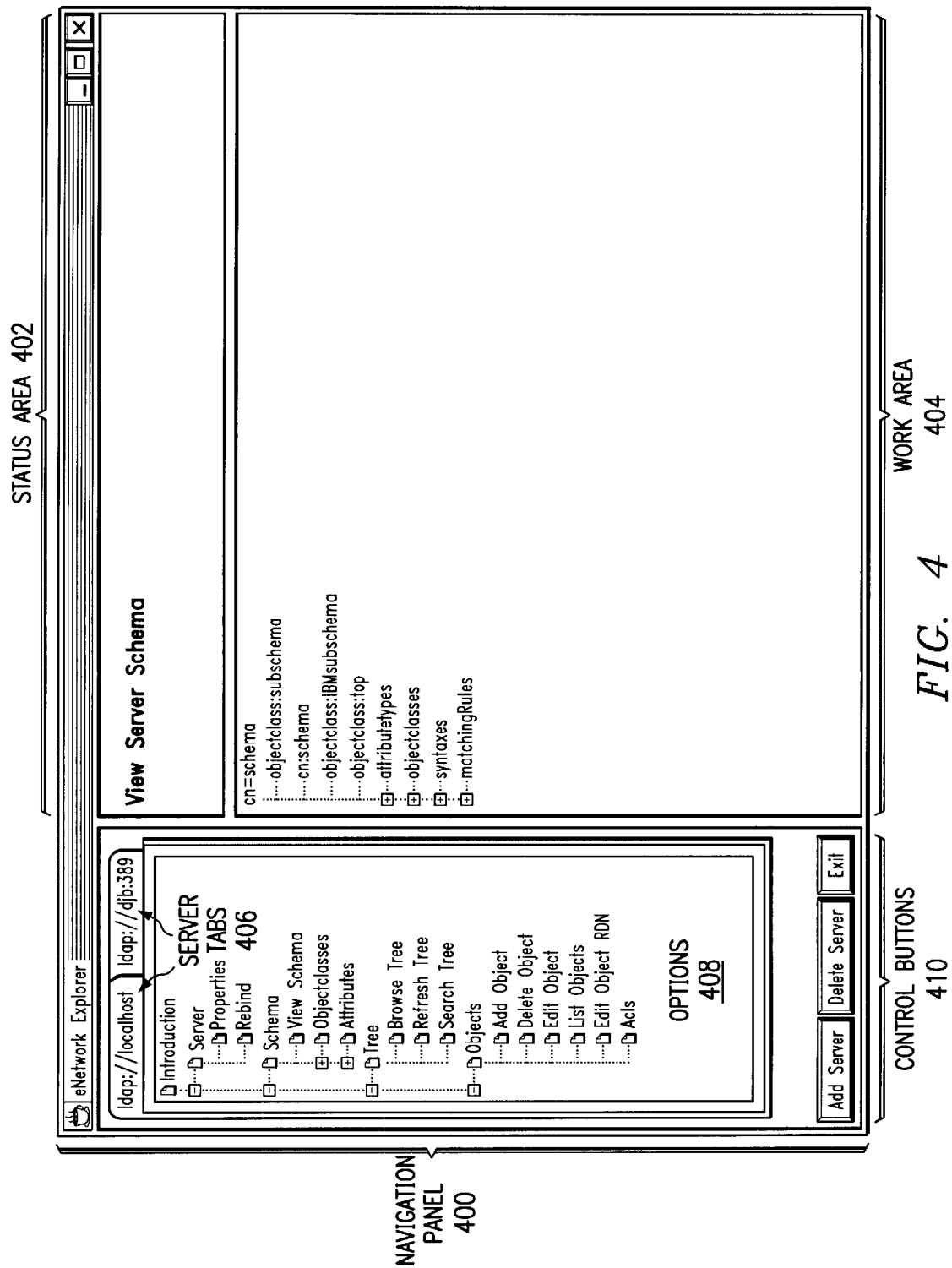
FIG. 4 is a screen image of the user interface in accordance with a preferred embodiment of the present invention.

FIG. 4 shows the basic layout of the screen. There are three major areas: Navigation Panel 400 appears on the left, Status Area 402 appears on the top right, Work Area 404 appears on the middle/lower right. Navigation Panel 400 is where the user controls the search operation. Each server is associated with a tab 406 at the top of the navigation panel. Clicking on the tab brings the panel for the associated server to the front of the view area. Each server has a list of options 408. Most options are self-explanatory; a few will be illustrated through a sequence of screen images below. The control buttons 410 at the bottom of the panel allow the user to add new servers, delete servers, or exit the program.

Status Area 402 displays messages to the user concerning the current operation. The current operation is viewing a server schema. There are no user controls in this area. All servers share Work Area 404. In this screen image the schema for a server is being displayed.

Figure 5:
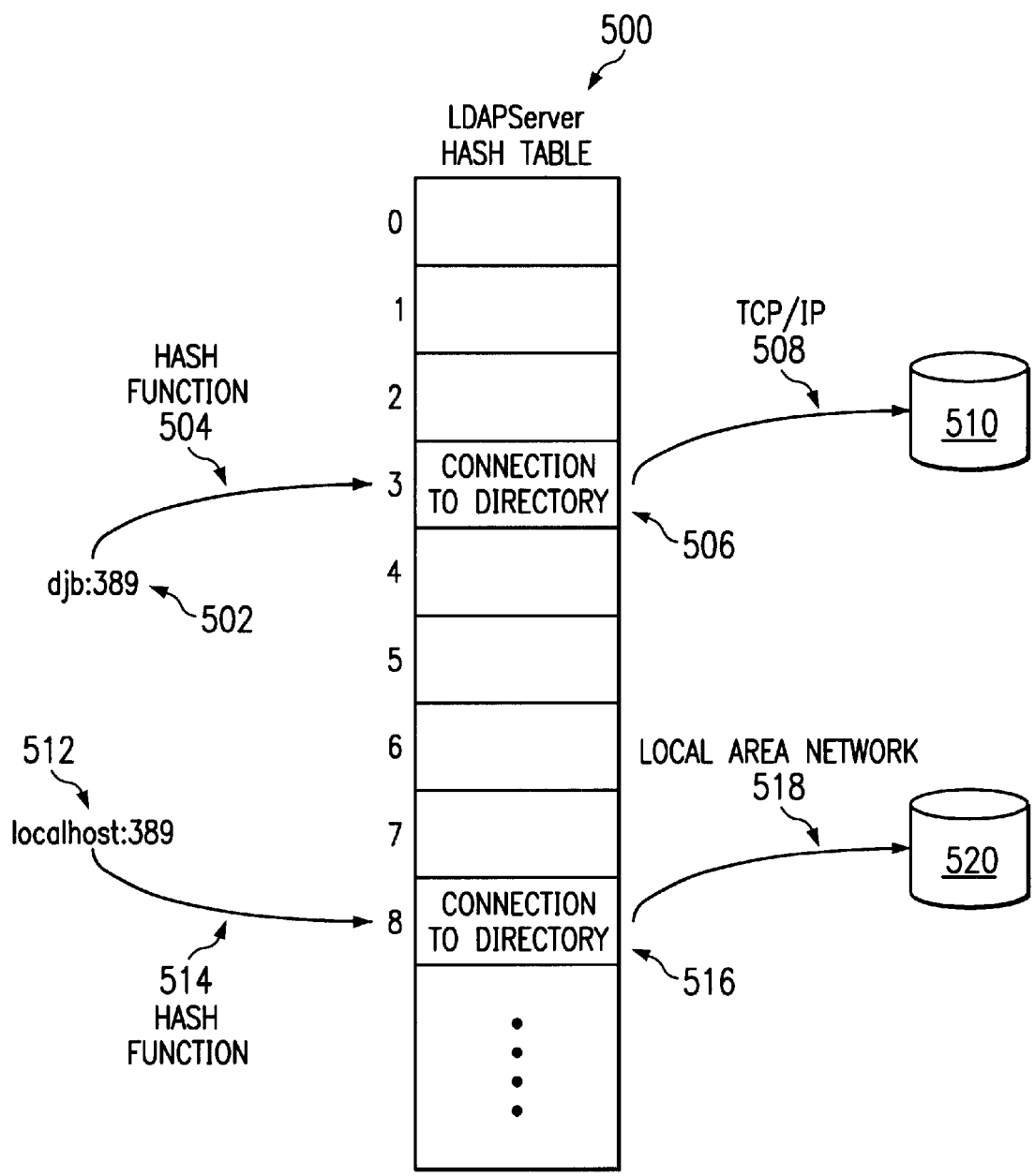
FIG. 5 is a block diagram showing an LDAP server hash table in accordance with a preferred embodiment of the present invention.

With reference now to FIG. 5, a diagram shows the LDAP Server hash table implementation of the graphical user interface shown in FIG. 4 in accordance with a preferred embodiment of the present invention. Connection information about all servers is stored in hash table 500 with one entry for each server connection. Each server is displayed on the GUI as tabs 406 in FIG. 4. In that particular screen image, two servers are shown—djb:389 and localhost (defaulting to port 389). In general, servers are identified by <hostname>:<port>. Returning to FIG. 5, hash function 504 is applied to server name "djb:389" 502 resulting in index value 3 into the hash table. Connection 506 is TCP/IP link 508 to the desired directory on server 510. In a similar manner, hash function 514 applied to "localhost:389" 512 results in index 8 in the hash table. Connection 516 is local area network link 518 to the desired directory on local server 520.

Those of ordinary skill in the art will appreciate that the user interface and underlying data structures could be implemented in a variety of programming languages. The following sequence of six screen images shows the implementation in Java in accordance with a preferred embodiment of the present invention With reference now to FIG. 6A and FIG. 6B, a sequence of two screen images shows the creation of an LDAP entry in accordance with the preferred embodiment of the invention. The main screen has three major areas: navigation panel 600, status area 602, and work area 604. In this case, the user has pressed "Add entry" 606 in the navigation options area. This causes popup image "Create an LDAP Entry" 608 to appear on the screen. At this time the user enters the distinguished name for the parent directory. Example entry 610 has the organization unit set to "Austin", the organization set to "IBM", and the country set to "us", for the USA.

Figure 6A:
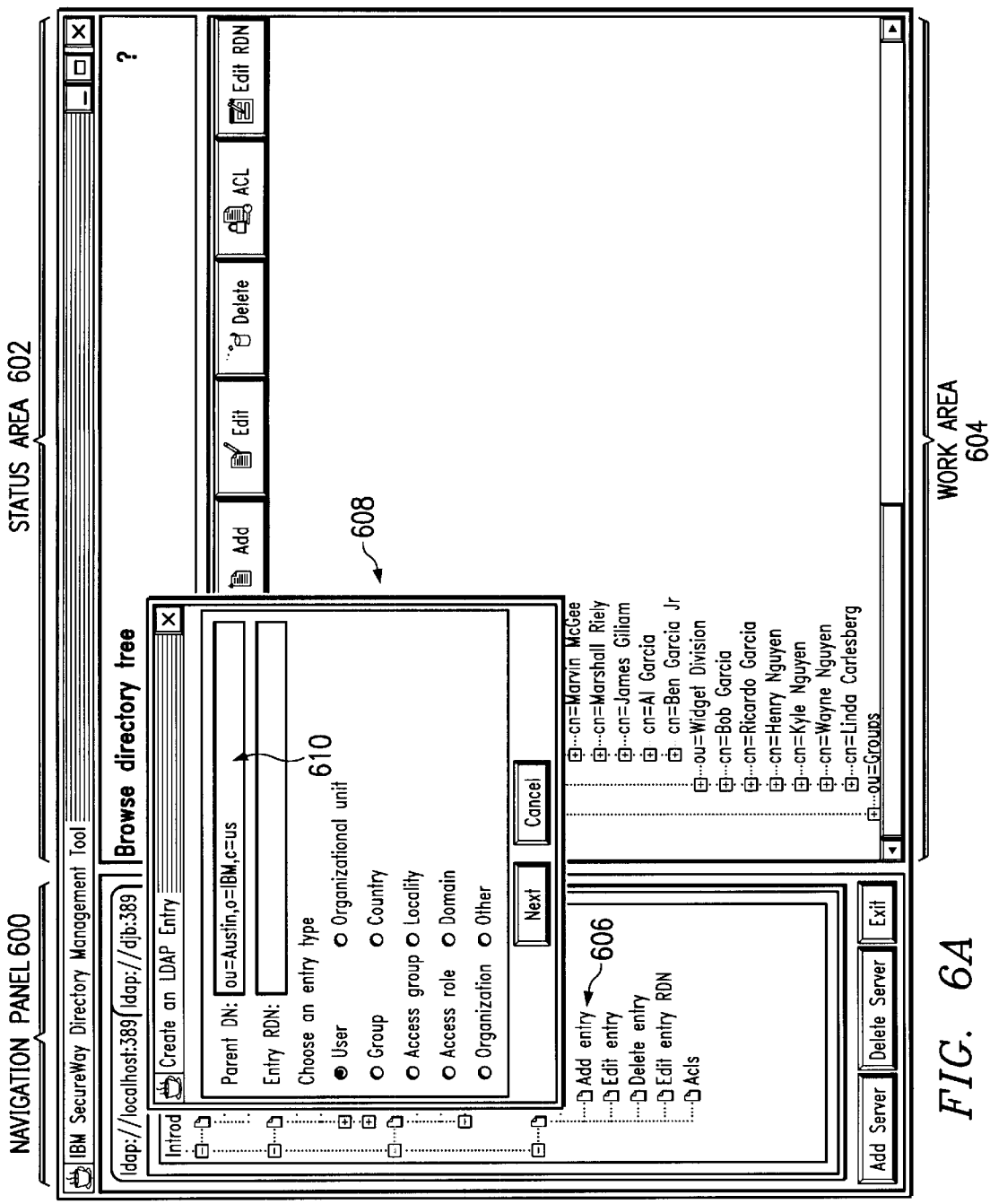
FIG. 6A and FIG. 6B are screen images showing creation of an LDAP entry in accordance with a preferred embodiment of the present invention.
Figure 6B:
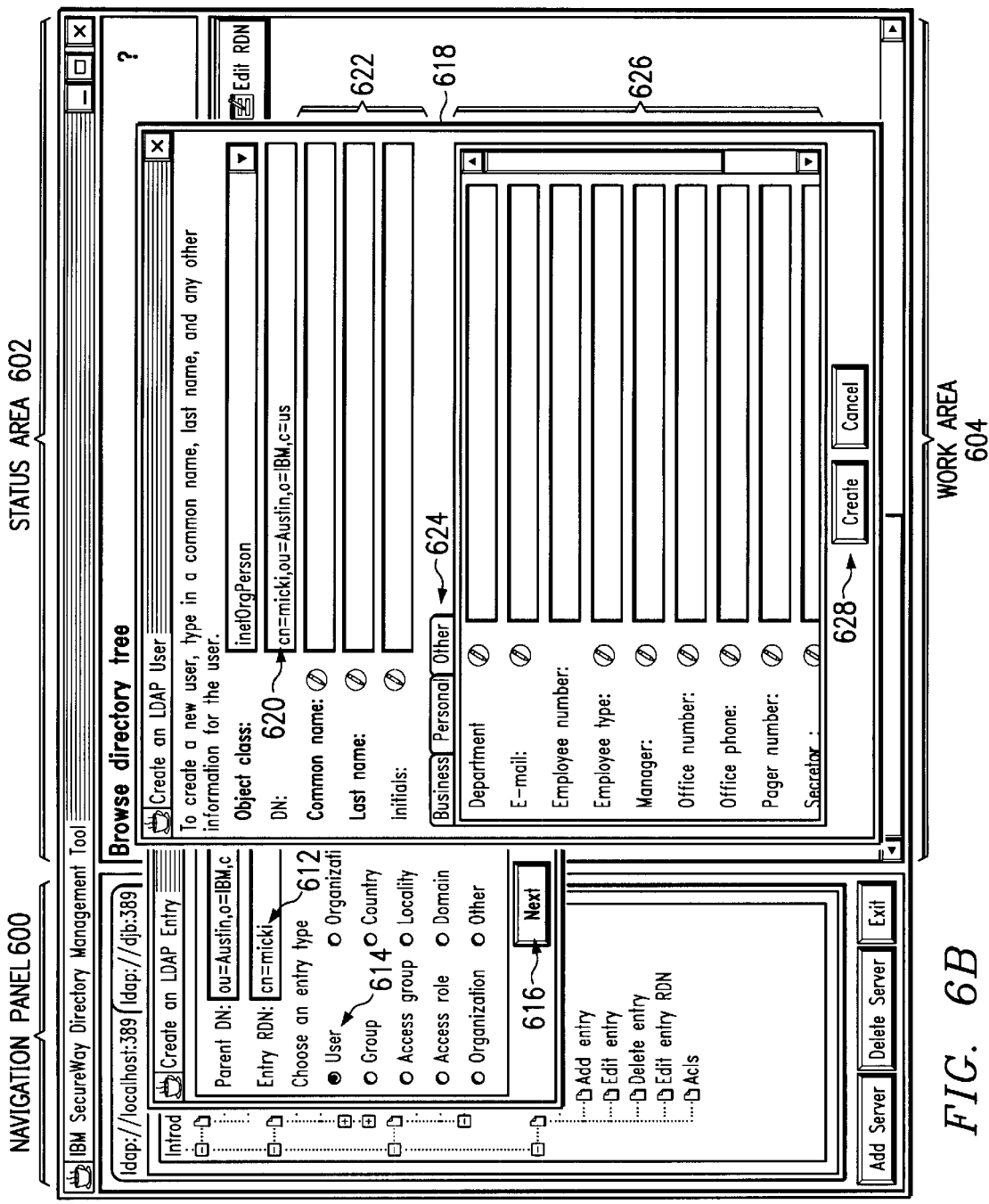

With reference now to FIG. 6B, where the sequence of user action to construct a new entry is completed. The common name 612 is set to micki and the entry type is set to user 614. The user presses Next 616 to cause popup image 618 to appear. Distinguished name 620 is carried over from the previous popup image. At this point the user can fill in as many data fields 622 as desired. Three tabs 624 allow selection between Business, Personal, and Other information. In this image, Business has been selected and the user can fill in data fields 626 as appropriate. The user presses Create 628 to cause the new LDAP entry to be created.

FIGS. 6A and 6B show only one particular instance of adding an entry. When adding an entry, the user specifies an objectclass, such a ePerson for an individual. Each objectclass has an associated set of attributes; some are required and some are not. This information is maintained in schema. When the Directory Management Tool (DMT) connects to a server, the schema are retrieved. When an entry of a particular objectclass is added, searched, modified, etc. the display screen will change dynamically to match the attributes associated with the schema. In other words, these panels will change their display based on the schema for the server that has been accessed by the DMT.

Figure 7:
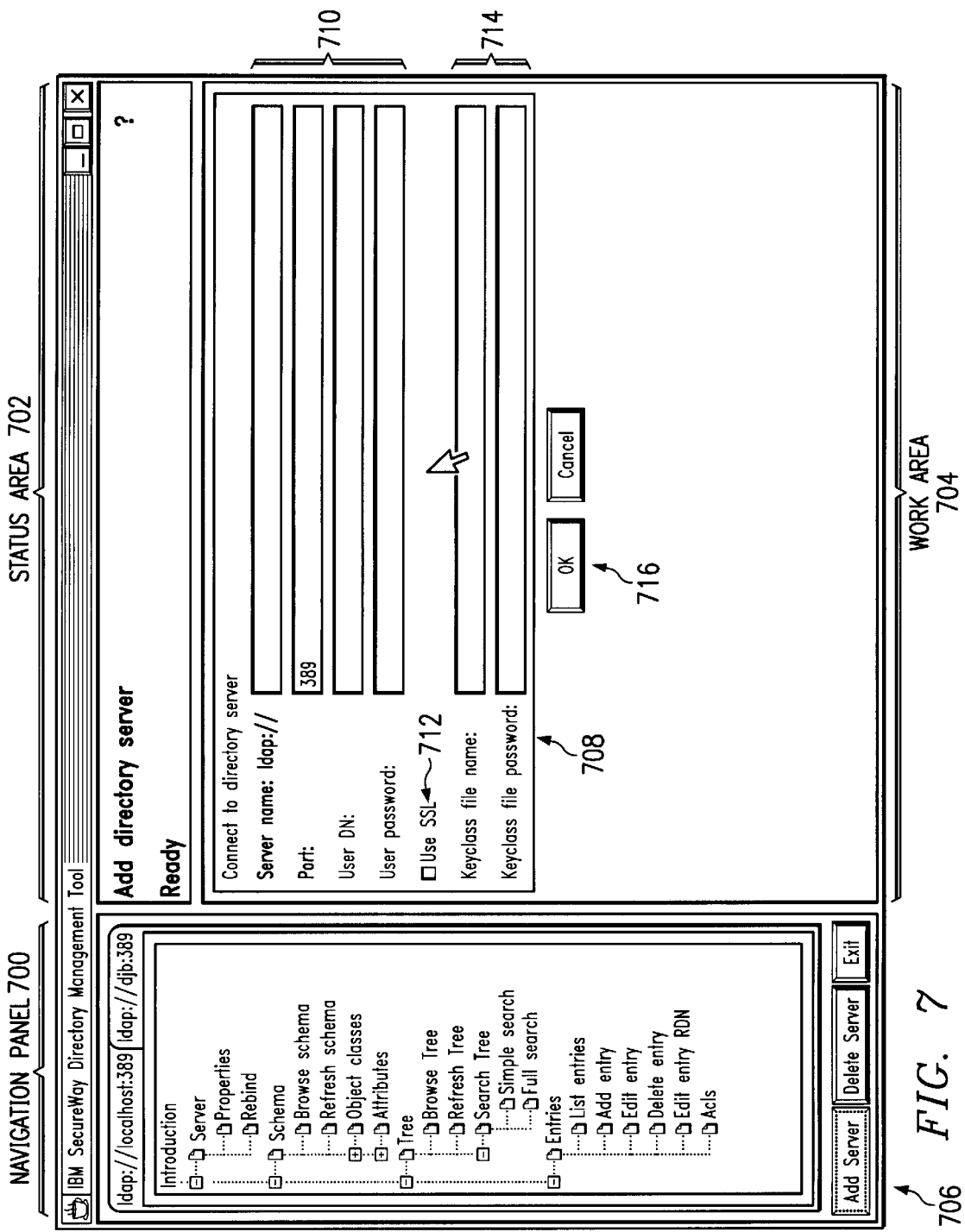
FIG. 7 is a screen image showing the creation of an LDAP directory server in accordance with a preferred embodiment of the present invention.

With reference now to FIG. 7, a screen image shows the creation of an LDAP directory server in accordance with the preferred embodiment of the invention. The main screen has three major areas: navigation panel 700, status area 702, and work area 704. In this case, the user has pressed "Add server" 706 in the navigation control buttons. This causes the work area to change to screen 708. Fields 710 are completed as appropriate. The user then specifies in checkbox 712 whether to use SSL encryption or not. If checkbox 712 is checked, then fields 714 are activated. Adding a directory server is completed by pressing OK button 716.

Figure 8:
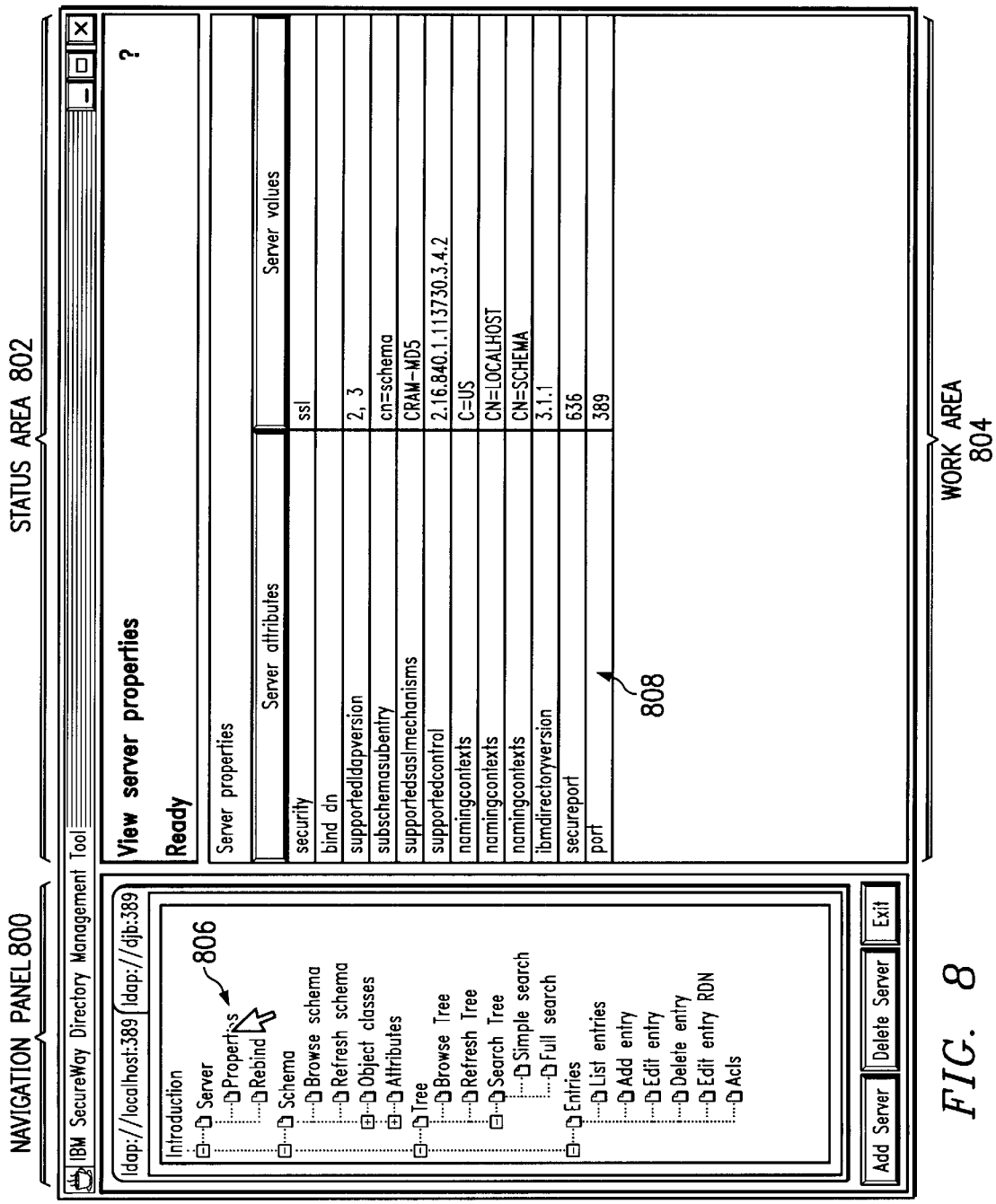
FIG. 8 is a screen image showing the display of server properties in accordance with a preferred embodiment of the present invention.

With reference now to FIG. 8, a screen image shows the display of server properties in accordance with the preferred embodiment of the invention. The main screen has three major areas: navigation panel 800, status area 802, and work area 804. In this case, the user has pressed "Properties" 806 under "Server" in the navigation options. This causes the work area to change to screen 808 that shows the properties of the selected server.

Figure 9:
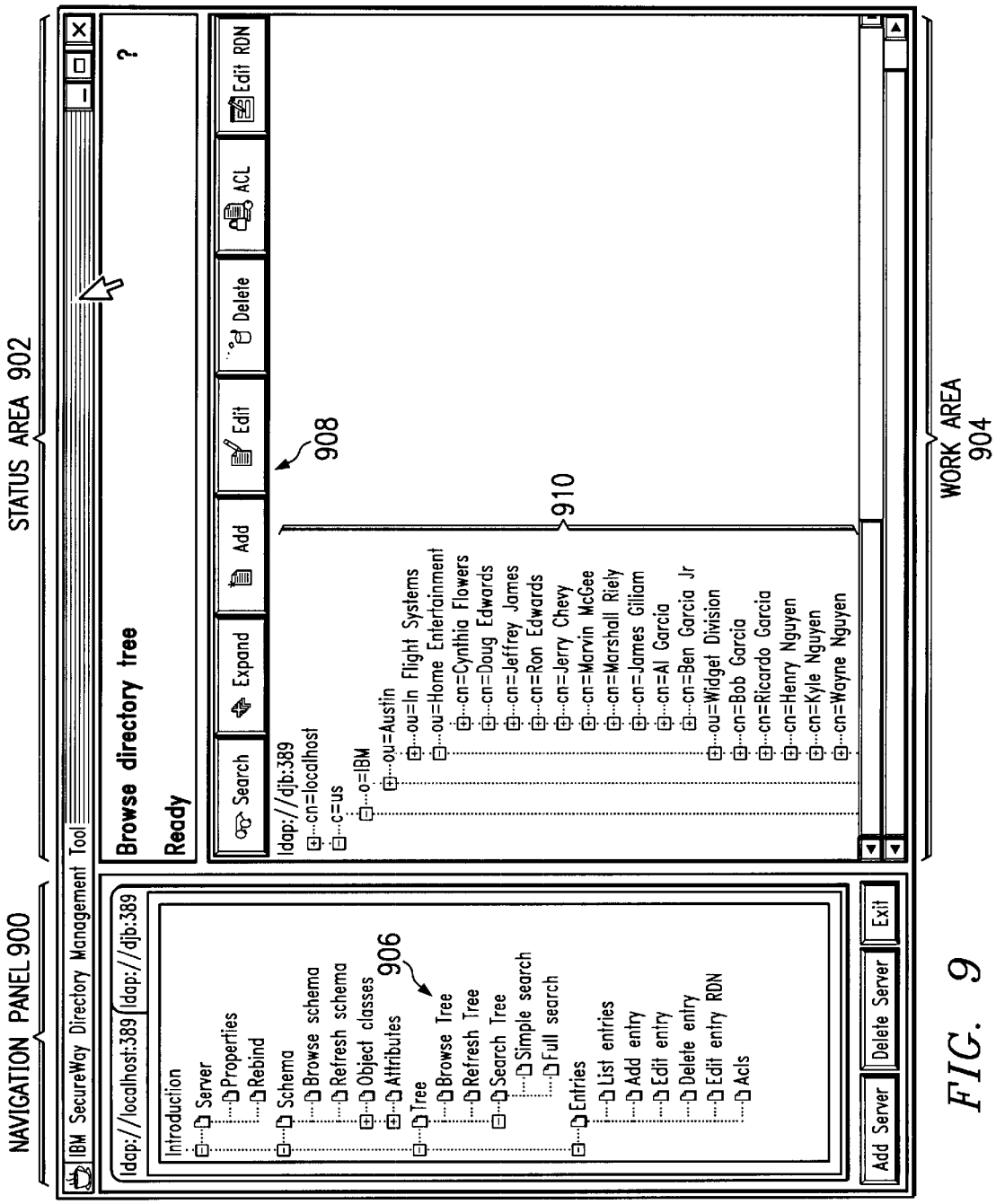
FIG. 9 is a screen image of the browse tree option in accordance with a preferred embodiment of the present invention.

With reference now to FIG. 9, a screen image shows the browse tree option in accordance with the preferred embodiment of the invention. The main screen has three major areas: navigation panel 900, status area 902, and work area 904. In this case, the user has pressed "Browse tree" 906 in the navigation options. This causes toolbar 908 to be displayed in the work area. Tree structure 910 can now be examined using an interface familiar to users of Windows Explorer, a product of Microsoft Corporation. The small box with a + to the left of the name indicates there are subdirectories. Clicking on this box causes the subdirectories to be displayed and the box changes to a – symbol. Clicking on the – will cause the subdirectories to be unexpanded. Using this familiar mechanism, the user can browse the tree structure to find the desired directory and to perform the desired action, as selected from toolbar 908.

Figure 10:
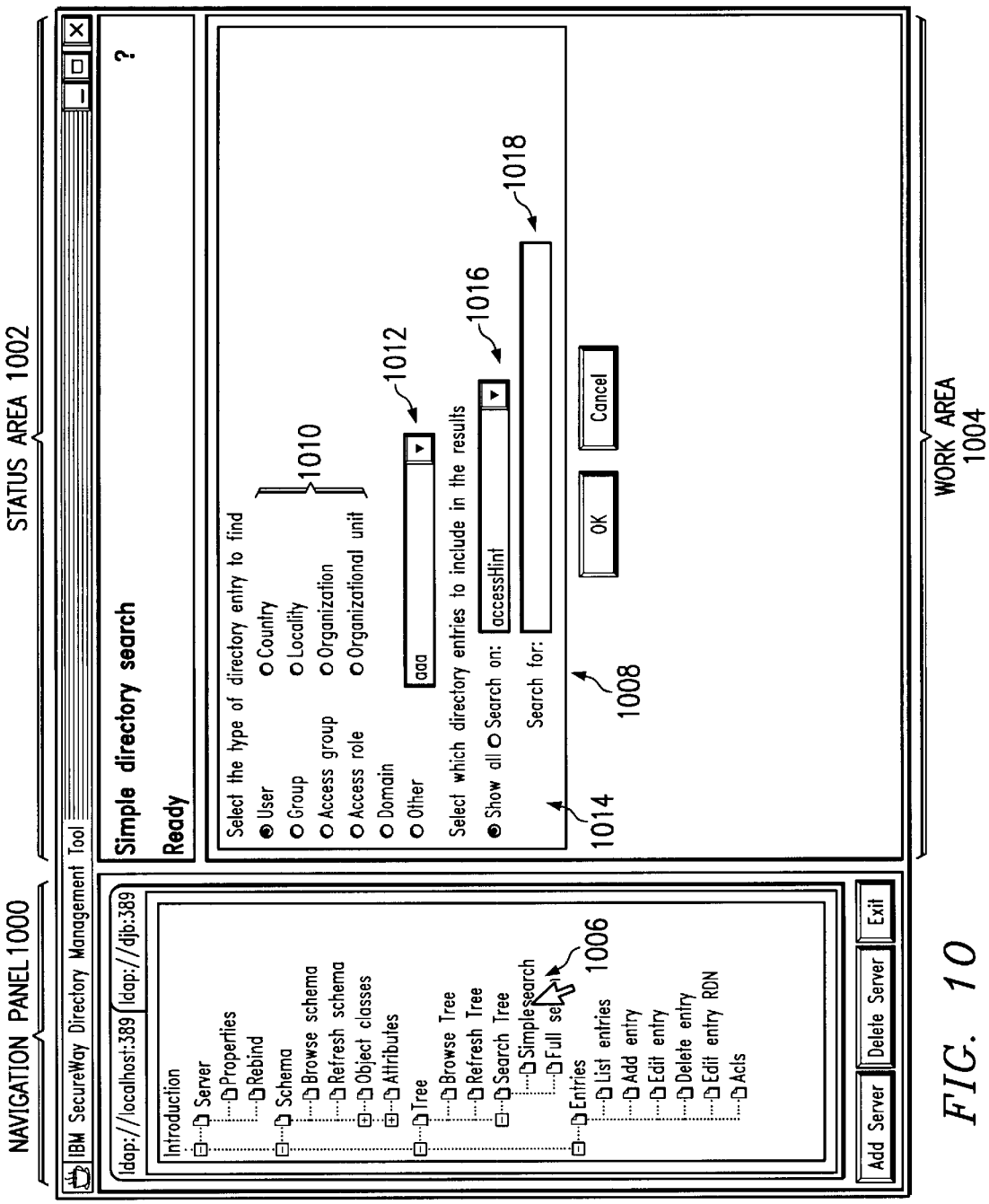
FIG. 10 is a screen image of a directory tree search in accordance with a preferred embodiment of the present invention.

With reference now to FIG. 10, a screen image shows a simple search of the directory tree structure in accordance with the preferred embodiment of the invention. The main screen has three major areas: navigation panel 1000, status area 1002, and work area 1004. In this case, the user has pressed "Simple search" 1006 in the navigation options. This causes the work area to change to screen 1008. A variety of options 1010 are built-in for easy selection. In this image "User" has been selected. If the desire option is not listed, the user can specify "Other" and select from pull down menu 1012. Next the user specifies the directory entries to be included in the results. This image shows the choice Show All 1014. The alternative is the "Search on" option which activates pull down menu 1016. The user then specifies the criteria in "Search for" field 1018. The search is initiated by pressing OK button 1020.

Those of ordinary skill in the art will appreciate that many other screen images could be shown. However, this sequence of images is sufficient to demonstrate the user-friendly look and feel of the present invention and the major advantages it has compared with the LDAP prior art mechanism for searching directories in a distributed system.

Within each search panel, the user has the usual LDAP search options, such as timelimit and sizelimit. The search panel also gives the user the option of following referrals if they choose, and the complete set of results from all servers will be displayed.

Another feature of the search panel is that the user is given a list of attributes, which are defined on the server. The attribute list may vary from server to server. The tool is able to display the correct list of attributes depending on which server the user is searching.

There is an additional option in search panel area representing the baseDn. The user can specify a baseDN or the user has the option of searching across the entire server. This allows the user to search for someone whose mailId is 'person@austin' without having any knowledge of the directory information tree structure on the server. Another example is that the user can say 'list groups' and all groups defined on the server will be shown regardless of what suffix they are under.

While performing operations on multiple servers, the user can be authenticated as a different person on each server. In other words, users can perform authenticated operation on any server connected through DMT Directory Management Tool using different Ids and passwords. With referral, only one server is allowed to perform authenticated access. A different logon is required to perform the operation on a referred server.

The present invention provides an improved method for locating a server in a distributed LDAP network, maintaining information for the server, displaying a tree of servers, browsing the tree of servers, and searching the tree of servers for an entry with specific attributes. The information maintained about the server includes its location, lists of attributes, and access control. The tree displayed can be for all servers combined or for an individual server. The search can be across the entire server or customized to a subset of servers. The search can be based on one of the following attributes: user, country, group, locality, access group, access role, organization, organization unit, domain, or can be based on user defined attributes.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. For example, drag-and-drop editing of the search tree can be added to the user interface. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a data processing system for managing a plurality of servers, the method comprising the data processing system implemented steps of:

providing a navigation area within a graphical user interface, wherein the navigation area displays options for selecting at least one server from the plurality of servers for management; and providing a work area within the graphical user interface, wherein the work area presents information about the at least one server and receives user input for managing and accessing information for at least one server.

2. The method of claim 1, wherein the options include at least one of server options, schema options, tree options, and object options.

3. The method of claim 1 further comprising:
providing a status area within the graphical user interface, wherein the status area displays the type of operation being performed.

4. The method of claim 1, wherein the work area includes a set of windows in which a first window in the set of windows displays information about the at least one server and a second window in the set of windows receives user input for accessing information for the at least one server.

5. The method of claim 1, wherein user input information for the at least one server includes managing information for the at least one server.

6. The method of claim 1, wherein user input accessing information for the at least one server includes searching for information for the at least one server.

7. The method of claim 1, wherein managing and accessing information for at least one server includes
displaying a tree structure; and
displaying connection information.

8. A method in a distributed data processing system for managing access to a plurality of servers, the method comprising the computer-implemented steps of:
locating a server within the plurality of servers;
maintaining information for the server;
displaying a tree of servers from the plurality of servers;
browsing the tree of servers; and
searching the tree of servers for a server with specific attributes.

9. The method of claim 8, wherein the access protocol is Lightweight Directory Access Protocol.

10. The method of claim 8, wherein the information maintained about the server includes its location, lists of attributes, and access control.

11. The method of claim 8, wherein the tree displayed can be for an individual server.

12. The method of claim 8, wherein the tree displayed can be for all servers combined.

13. The method of claim 8, wherein the search can be across an entire server.

14. The method of claim 8, wherein the search can be customized to a subset of servers.

15. The method of claim 8, wherein the search can be based on one of the following attributes: user, country, group, locality, access group, access role, organization, organization unit, domain.

16. The method of claim 8, wherein the search can be based on user defined attributes.

17. A data processing system for managing access to a plurality of servers, the data processing system comprising:
locating means for locating a server within the plurality of servers;
maintaining means for maintaining information for the server;
displaying means for displaying a tree of servers from the plurality of servers;
browsing means for browsing the tree of servers; and
searching means for searching the tree of servers for a server with specific attributes.

18. The data processing system of claim 17 further comprising:
locating means based on Lightweight Directory Access Protocol.

19. The data processing system of claim 17 further comprising:
maintaining means for information about the server including its location, lists of attributes and access control.

20. The data processing system of claim 17 further comprising:
displaying means for a tree for an individual server.

21. The data processing system of claim 17 further comprising:
displaying means for a tree for all servers combined.

22. The data processing system of claim 17 further comprising:
a searching means for a search across the entire server.

23. The data processing system of claim 17 further comprising:
a searching means for a search customized to a subset of servers.

24. The data processing system of claim 17 further comprising:
a searching means for a search based on one of the following attributes: user, country, group, locality, access group, access role, organization, organization unit, domain.

25. The data processing system of claim 17 further comprising:
a searching means for a search based on user defined attributes.

26. A computer program product on a computer-readable medium for use in a network workstation for managing access to a plurality of servers, the computer program product comprising:
instructions for locating a server from the plurality of servers;
instructions for maintaining information for the server;
instructions for displaying a tree of servers from the plurality of servers;
instructions for browsing the tree of servers; and
instructions for searching the tree of servers for an entry with specific attributes.

27. The computer program product of claim 26, wherein the access protocol is Lightweight Directory Access Protocol.

28. The computer program product of claim 26, wherein the information maintained about the server includes its location, lists of attributes, and access control.

29. The computer program product of claim 26, wherein the tree displayed can be for an individual server from the plurality of servers.

30. The computer program product of claim 26, wherein the tree displayed can be for all servers combined.

31. The computer program product of claim 26, wherein the search can be across the entire server.

32. The computer program product of claim 26, wherein the search can be customized to a subset of servers.

33. The computer program product of claim 26, wherein the search can be based on one of the following attributes: user, country, group, locality, access group, access role, organization, organization unit, domain.

34. The computer program product of claim 26, wherein the search can be based on user defined attributes.

* * * * *